US012734387B2

(12) United States Patent
Bradley et al.

(10) Patent No.: US 12,734,387 B2
(45) Date of Patent: Sep. 15, 2026

(54) SIMULATOR ARRAY TRAINING SYSTEM

(71) Applicant: Lion Group, Inc., Dayton, OH (US)

(72) Inventors: Brian P. Bradley, Niskayuna, NY (US); Chris Munn, Rensselaer, NY (US)

(73) Assignee: LION GROUP, INC., Dayton, OH (US)

(*) Notice: Subject to any disclaimer, the term of this patent is extended or adjusted under 35 U.S.C. 154(b) by 1134 days.

(21) Appl. No.: 17/719,865

(22) Filed: Apr. 13, 2022

(65) Prior Publication Data

US 2022/0323808 A1 Oct. 13, 2022

Related U.S. Application Data

(60) Provisional application No. 63/174,118, filed on Apr. 13, 2021.

(51) Int. Cl.
*A62C 99/00* (2010.01)
*G06F 3/14* (2006.01)
(Continued)

(52) U.S. Cl.
CPC ........ *A62C 99/0081* (2013.01); *G06F 3/1446* (2013.01); *G06T 11/00* (2013.01); *G09B 19/00* (2013.01)

(58) Field of Classification Search
CPC ... A62C 99/0081; G06F 3/1446; G06T 11/00; G09B 19/00; G09B 19/003; G01R 29/26; G01R 27/00; G01N 27/223
(Continued)

(56) References Cited

U.S. PATENT DOCUMENTS

| | | | |
|---|---|---|---|
| 5,823,784 | A | 10/1998 | Lane |
| 6,129,552 | A | 10/2000 | Deshoux et al. |

(Continued)

FOREIGN PATENT DOCUMENTS

| | | | |
|---|---|---|---|
| CN | 110874964 | A | 3/2020 |
| EP | 1905486 | A1 | 4/2008 |
| KR | 101112189 | B1 | 2/2012 |

OTHER PUBLICATIONS

BullEx. "BullEx BullsEye Laser-Driven Fire Extinguisher Training." YouTube, Mar. 28, 2012, www.youtube.com/watch?v=UFKNs_C0v3I. (Year: 2012).*

(Continued)

*Primary Examiner* — Xuan M Thai
*Assistant Examiner* — Zachary Joseph Pollock
(74) *Attorney, Agent, or Firm* — Thompson Hine LLP

(57) ABSTRACT

A system including a plurality of display panels, each display panel, based upon data or properties of a modeled fire, being configured to display a portion of a simulated fire such that together the plurality of display panels display a composite fire image. Each display panel has a display portion configured to display the portion of the simulated fire and at least one sensor to detect an extinguishant directed at the display portion. Each display panel also includes a display panel controller operatively coupled to the display portion, the at least one sensor, and the display panel controller of at least one other display panel. The display panel controller is configured to provide the data relating to the modeled fire, corresponding to the outer edge of the display portion, to at least one adjacent display panel.

20 Claims, 8 Drawing Sheets

(51) Int. Cl.
*G06T 11/00* (2026.01)
*G09B 19/00* (2006.01)

(58) Field of Classification Search
USPC .......................................... 434/11; 324/66 X
See application file for complete search history.

(56) References Cited

U.S. PATENT DOCUMENTS

| | | | | |
|---|---|---|---|---|
| 7,748,983 | B2 | 7/2010 | Blackburn et al. | |
| 7,965,257 | B2 | 6/2011 | Perkins et al. | |
| 8,096,810 | B2 | 1/2012 | Blackburn et al. | |
| 8,362,970 | B2 | 1/2013 | Perkins et al. | |
| 8,427,391 | B2 | 4/2013 | Perkins et al. | |
| 9,773,424 | B2 | 9/2017 | Blackburn et al. | |
| 11,376,459 | B2 | 7/2022 | Bradley | |
| 2003/0201957 | A1 | 10/2003 | Mix | |
| 2007/0218436 | A1 | 9/2007 | Blackburn et al. | |
| 2009/0197229 | A1 | 8/2009 | Blackburn | |
| 2010/0304345 | A1 | 12/2010 | Blackburn et al. | |
| 2015/0079558 | A1* | 3/2015 | Blackburn ............ | G09B 19/00 434/226 |
| 2017/0296854 | A1 | 10/2017 | Bradley et al. | |

OTHER PUBLICATIONS

Training Simulators. “Flaim Fire Extinguisher VR Simulator PASS | PTASS.” YouTube, Feb. 10, 2021, www.youtube.com/watch?v=19vqfhTqZsg. (Year: 2021).*
Flaim Systems. “Flaim Systems.” YouTube, www.youtube.com/channel/UCT9QeGpOPEu1Gm5iNItmmcg. (Year: 2018).*
BullEx. “Training with the BullsEye and R.A.C.E. Station from BullEx.” YouTube, Sep. 17, 2015, www.youtube.com/watch?v=jauiagGzUVI. (Year: 2015).*
Training Simulators. “VR Flaim Fire Extinguisher Simulator (Immersive Virtual Reality).” YouTube, Jul. 22, 2020, www.youtube.com/watch?v=7eJEYMgI7Zw. (Year: 2020).*
International Search Report and Written Opinion for International Application No. PCT/US2022/024570, 12 pages, Jul. 6, 2022.
Extended European Search Report, European Patent Application No. 22788835.1, 6 pages, Dec. 10, 2024.
China National Intellectual Property Office, Notification of the First Office Action (with partial English translation), Chinese Patent Application No. 202280028182.6, 11 pages, Sep. 29, 2025.
China National Intellectual Property Administration, Second Office Action (with English translation), Chinese Patent Application No. 202280028182.6, 11 pages, Apr. 1, 2026.
China National Intellectual Property Administration, Decision of Rejection (with English translation), Chinese Patent Application No. 202280028182.6, 20 pages, Jul. 2, 2026.

* cited by examiner

Simulator Panel Configuration

502 Height: 2

504 Width: 2

Grid

506

| 4 2321 | 3 2315 |
| --- | --- |
| 2 2324 | 1 2314 |

508 Simulator Panel configuration settings

4 - 2321

3 - 2315

1 - 2314

2 - 2324

Simulator Panel additional settings

510

| Setting 1 | Info |
| --- | --- |
| Setting 2 | Info |
| Setting 3 | Info |
| Setting 4 | Info |

SIMULATOR ARRAY TRAINING SYSTEM

This application claims priority to U.S. Provisional Patent Application Ser. No. 63/174,118 filed on Apr. 13, 2021, the entire contents of which are hereby incorporated by reference.

TECHNICAL FIELD

The present disclosure is directed to an emergency response training system, and more particularly, to an emergency response training system including an array of display panels.

BACKGROUND

Fire fighter trainers and simulators are used to train fire fighters and other individuals, including in some cases members of the general public, in proper firefighting techniques. Such trainers and simulators may provide a realistic but simulated firefighting environment by utilizing a display panel with simulated flames that can react to actual or simulated extinguishants. However existing system may not sufficiently measure the performance of the trainee and/or spread of the simulated flames to provide accurate feedback. In addition, existing system may be difficult to setup and configure.

Many existing training systems also lack the ability to adjust and scale the training experience according to the needs of the trainee. For instance, if it is desired to present a simulation involving an evolved structure fire, most existing system do not have adequate size to display such a simulation on a realistic scale. Instead, the scale of the displayed fire might correspond to a small appliance. Moreover, even if the system is sufficiently large to sufficiently display, for example an evolved fire structure to scale, most systems lack flexibility to scale down when necessary to more efficiently display smaller fire or display.

SUMMARY

In one embodiment, the invention is a system including a plurality of display panels, each display panel being configured to display a portion of a simulated fire such that together the plurality of display panels display a composite fire image. Each display panel has a display portion configured to display the portion of the simulated fire and at least one sensor configured to detect an extinguishant directed at the display portion. Each display panel also includes a display panel controller operatively coupled to the display portion, the at least one sensor, and the display panel controller of at least one other display panel. The display panel controller is configured to at least partially determine qualities of a modeled fire; and determine changes of the modeled fire based upon inputs received from the at least one sensor. The display panel controller is also configured to cause the display portion to display the portion of the simulated fire based upon data or properties of the modeled fire. The display panel controller is configured to provide data relating to the modeled fire, at or adjacent to an outer edge of the display portion, to at least one adjacent display panel, and the display panel controller is configured to receive data relating to a modeled fire, at or adjacent to an outer edge of the at least one adjacent display panel.

DETAILED DESCRIPTION

Figure 1:
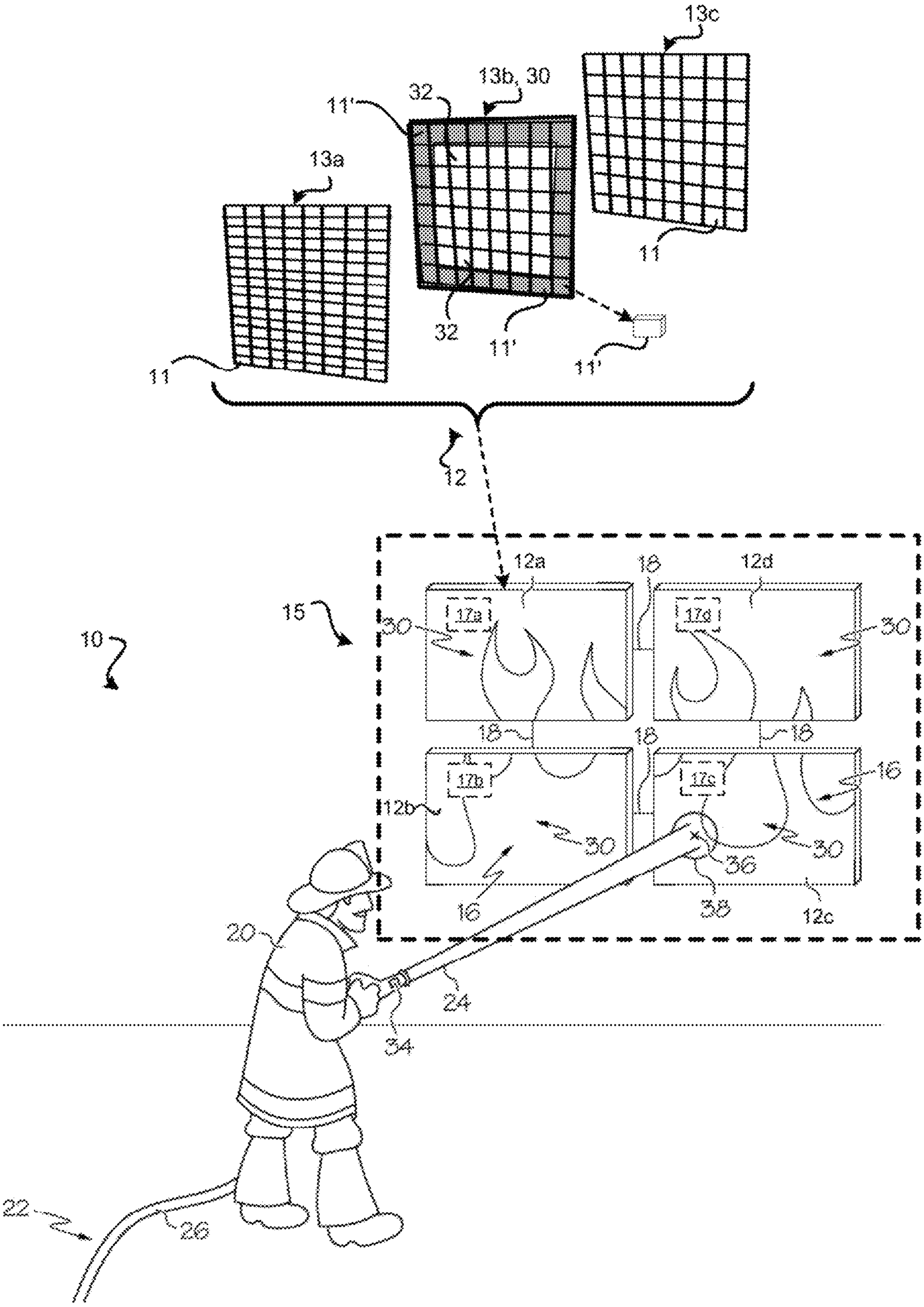
FIG. 1 is a schematic representation of a training system that includes an array of display panels.

FIG. 1 shows an exemplary firefighting training system 10 which, in the illustrated embodiment, includes a plurality of display panels 12 arranged in a group or array 15. In illustrated embodiment the array 15 includes or is made up of four separate display panels 12*a*, 12*b*, 12*c*, and 12*d* arranged in a 2×2 grid. However the array 15 can include more or less than four display panels 12, and in some cases only a single display panel 12 is used, which case the "array" 15 includes a single display panel 12. The display panels 12 can also be arranged in various configurations other than the 2×2 configuration in FIG. 1, including symmetrical or asymmetrical configurations and/or rectangular or other shaped arrays 15. Since the array 15 is scalable, differing number of display panels 12 can be used, and in different configurations (e.g., 1×1, 1×2, 1×3, 1×4, 2×2, 2×3, 2×4, 3×2, 3×3, 3×4, etc.). Moreover the display panels 12 can be arranged in various other manners and/or take other forms that as shown, such as being mounted on or in, or coupled to other devices or components, such as props, etc.

The display panels 12*a*, 12*b*, 12*c*, 12*d* can be operatively coupled to each other via wired connectors 18, and/or by a wireless connection(s), and/or by networked or distributed network or the like, as will be described in greater detail below (e.g., in one case to allow sharing of the corresponding data at adjacent edges based on the configuration setup). Each display panel 12 can include an associated controller 17 (e.g., each associated display panel 12*a*, 12*b*, 12*c*, 12*d* can include an associated controller 17*a*, 17*b*, 17*c*, 17*d*), such as a processor, microprocessor, controller, computer, CPU or the like. Each controller 17 (and/or controller 312, as described in greater detail below) can set up and/or track a modeled fire or a portion thereof by setting up and/or tracking information that relates to the physics or physical characteristics of a modeled fire (also known as a simulated fire), where the information that relates to, among other features, fire temperature, ambient temperature, type of fuel, density, moisture content, a detected extinguishant (if applicable), an extinguishant temperature, and an extinguishant flow rate, volatility, direction heading, fuel content, etc. and historical data relating to the same. In this manner the controllers 17/312 can create, modify, track and store the properties of a modeled fire. In one case, the modeled fire can include or take the form of the data stored at or corresponding to each element 11.

In one embodiment, the modeled fire is broken down into various regions, elements or pixels 11 that can in one case, correspond to regions, elements or pixels 11 of one or more subsystem 13 of each panel 12, as will be described in greater detail below. In one case, the controllers 17/312 break the modeled fire into regions elements 11 that correspond to elements of one or more subsystems 13. However, the controllers 17/312 can also use a system of regions or elements 11 that differs from the regions or elements 11 of the subsystems 13, in which case the regions or element 11 of the controllers 17/312 can be mapped to corresponding regions or elements 11 of the subsystems 13.

Each controller 17 can be configured to receive and process inputs and provide outputs, including an output which can control the displayed fire image(s) 16 (e.g., a fire simulation) based upon information of the modeled fire at each element 11. In this manner each display panel 12 can be controlled to provide outputs that correspond to or visually represent the modeled fire. Alternatively or in addition, each display panel 12*a*, 12*b*, 12*c*, 12*d* (and/or its associated controller 17) can be coupled to a common or central controller 312 (FIG. 3) which can provide the same functions as the controller 17 and/or complementary functions.

Each display panel 12 can generate and display an image (s) as a visual representation of the modeled fire which is visually perceivable by a user/trainee (such as a firefighter), to which a user/trainee 20 is cued to respond. In one case each display panel 12 is, for example, a LED or OLED display or panel that is analogous to, or generally the same as, a LED or OLED television screen. However the display panels 12 can include or embody other technologies for displaying images, such as CRT, digital light processing, etc., so long as the display panels 12 can, if desired, be made sufficiently fluid-tight and able to resist forces and extinguishants applied during training exercises. The display panels 12 can include a light source and display screen integrated into a single unit, with both being positioned within or coupled to a single housing such that each display panel 12 is relatively compact and manually carryable.

Figure 7:
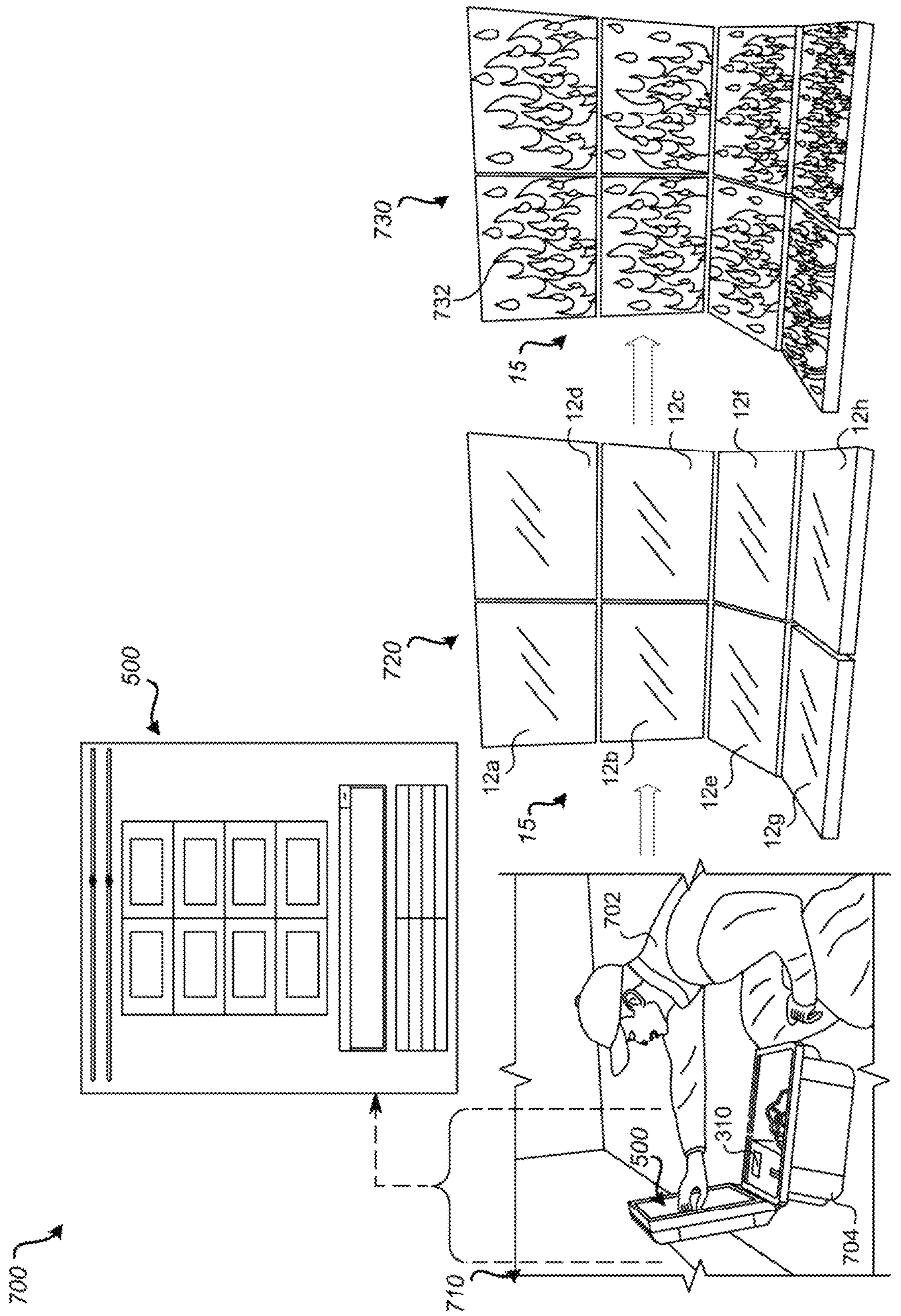
FIG. 7 is an illustration of a sample fire simulation with a training system that includes an array of display panels and a graphical user interface.

It should be noted that while FIG. 1 illustrates the display panels 12 mounted to a wall, the display panels 12 could instead be portable and/or stand-alone devices, or coupled to positioned inside other objects, such as props. Additionally, the display panels 12 can further be configured to be positioned in various angular positions with respect to how they are positioned relative to a user. For example, one or more display panels 12 may be positioned on a wall or vertical surface (e.g., as illustrated in FIG. 1), while one or more display panels 12 may be placed on the ground or horizontal surface, and one or more display panels 12 may be tilted or positioned at an angle (e.g., against a corner of a room), as shown in FIG. 7, which will be described in greater detail below.

Each display panel 12 can be configured to display a fire image 16 (which can include displayed flame and/or smoke) or other hazardous conditions. In some embodiments, as shown in FIG. 1, the display panels 12 are networked together such that each display panel 12 displays part of a larger composite fire image 16. For example, a large fire or flame may be displayed as the composite fire image 16, wherein each display panel 12 displays only part of the larger flame or fire 16, but with continuity and coordination between the display panels 12 such that they cooperate to display the larger image/composite fire image 16 as a generally continuous, but distributed, image in a dynamic manner, as will be described in greater detail below. In this manner, modeled fire data, which can be tracked on the controllers 17/312, can provide data which is further processed and translated into image data, which is displayed as a simulated fire/fire simulation on the display panels 12.

The trainee 20 may be provided and/or have access to an extinguishant system 22 which may be able to spray/project a real and/or simulated and/or virtual extinguishant 24. For example, in some embodiments, the extinguishant system 22 includes a hose 26 which sprays extinguishant 24 that can be directed at the display panels 12. In one particular embodiment, the extinguishant system 22 sprays extinguishant 24 in the form of liquid water at pressures the same as or comparable to those provided by fire hydrants, pump trucks or the like using fire fighter handlines (at least about 50 psi in some embodiments, or at least about 100 psi in another case, or at least about 125 psi in yet another case) to provide a realistic training experience. However, the extinguishant system 22/hose 26 can also spray solids (such as chemical powder), liquids (such as water, foam, or combinations thereof) or gases (such as inert gases including CO2) of various forms.

In some embodiments, the extinguishant system 22 may emit a material that is not necessarily an actual fire extinguishant (or at least not a widely used fire extinguishant), but may be easier to use in the training system 10 due to ease of, for example, storing, processing and/or clean up, in the form of a simulated extinguishant such as solid particles or pellets, foam, gases, evaporative liquids or gases, etc. The extinguishant system 22 may also or instead emit a directed signal that is not manually detectable by the user and/or which may not have any noticeable mass, which can be visible or not visible by the user, such as electromagnetic waves (more particularly, emissions in the IR frequency) or the like. For the purposes of this document, such items as described above emitted by the extinguishant system 22 (including actual, simulated and virtual extinguishants) are included in the term "extinguishants."

Each display panel 12 can include a sensor system 30 (also termed a sensor subsystem 13*b*, as described in greater detail below) integrated therein or coupled thereto to sense the extinguishant 24 sprayed or directed at the display panel 12. Each sensor system 30 can include one or a plurality of sensors 32 (or referred to herein as sensor elements 32). In some embodiments, each sensor system 30 can include a plurality of sensors 32 that cover the entire surface area of each display panel 12, or portions thereof, with a regular spacing therebetween, shown as the grid of sensors 32 in FIG. 1. In this case each sensor 32 can cover or be assigned to a portion of the surface area of the associated panel 12 (e.g. a region, element or pixel).

In some embodiments, each display panel 12 includes a generally clear or transparent front protective screen or subsystem that is made of glass or polymer material, including polycarbonate. In this case, the protective screen may be made of a particularly durable material that can withstand the high pressures associated with extinguishants used in actual or simulated firefighting. The sensor system 30/subsystem 13*b* and/or each sensor 32 can be placed at various positions in the thickness of the associated display panel 12. For example, in some embodiments, each sensor 32 is placed on the front of the protective screen of the display panel 12, in some embodiments, flush with the protective screen. While this arrangement can provide increased sensitivity, the sensors 32 may be more exposed and prone to damage. Alternatively, each sensor 32 can be placed on the back of the protective screen (but still in front of the light source in one case). This arrangement may provide greater protection, but less sensitivity. In yet another embodiment, each sensor 32 is embedded in a center of the thickness of the protective screen. This arrangement can provide both good sensitivity and protection but may be more difficult to manufacture in some cases. If desired, in some cases the sensors 32 can be positioned behind the light source, such as in the case of capacitance sensors, but in this case the signal from such sensors may be weaker.

The plurality of sensors 32 can be spaced about the front (display) surface of the associated display panel 12. In some embodiments, the plurality of sensors 32 are temperature sensors that utilize capacitance measurements to detect an extinguishant 24. For example, when a stream or jet of an extinguishant 24, such as water, is directed at a sensor 32, the extinguishant material will form a turbulent mixture with air within the electric field of that sensor 32. The spatiotemporally varying dielectric characteristics of the air/extinguishant mixture will create signification variations within a series of capacitance measurements that may be compared to reference samples, which in turn can be used to determine the amount of extinguishant 24 that is being applied to the display panel 12/sensor system 30/sensor 32 and/or associated element 11. In one case, the sensors 32 can operate as disclosed in U.S. patent application Ser. No. 16/943,714 entitled Array-Based Capacitance Sensor Device and Methods For The Detection Of Applied Streams Of Water Or Other Extinguishants, filed on Jul. 30, 2020, the entire contents of which are hereby incorporated by reference.

Alternatively, some or all of the sensors 32 can take the form of temperature sensors, such as thermistors, that can react to differing temperatures provided by conduction and/or convection of the extinguishant 24. In the case where each sensor 32 is a thermistor, an electrical current is passed therethrough, and the change in resistance in the thermistor can then be used to calculate a change in temperature, which in turn can be used to determine the amount of extinguishant 24 that is being applied to the display panel 12/sensor system 30/sensor 32.

As noted above, the extinguishant sensors 32 can be configured to detect physical interaction with or physical features of the extinguishant 24. However, the extinguishant sensors 32 can also take the form of or include a device or sensor which detects emissions in the electromagnetic spectrum including or near the infrared wavelengths, and take the form of for example photoelectric sensors, charge-coupled devices, electro-optical sensors, LEDs, laser sensors, wavefront sensors, etc. These sensors and other can be used when the extinguishant 24 takes the form of a virtual extinguishant, such as electromagnetic waves.

In some embodiments, the extinguishant 24 may impart cooling to the sensors 32 which changes the electrical resistance of the sensors 32, produces a voltage or change in voltage across the sensors 32, and/or produces a current or change in current through the sensors 32. In this case the extinguishant 24 would typically be a fluid or a solid. As further examples, the sensors 32 may take the form of or include a bimetallic strip that exhibits a change in internal stresses when heated or cooled, or can instead take the form a thermocouple or thermopile. Moreover, the sensor(s) 32 can take any of a wide variety of other forms, including nearly any device having physical or other properties that change when an external stimulus, such as a simulated, actual or virtual extinguishant, is applied to the sensor 32 and/or in the area or vicinity defined by the associated region, pixel or element. For example, the sensors 32 may include a thermal imaging device such as a thermal camera or an infrared thermometer. The sensors 32 can also include vibration sensors, microphones, capacitive sensor, resistive sensors, reflective sensors and the like.

The sensors 32 can be either active or passive. When the sensors 32 are passive, they require no or very little power or external heat to function or respond to the effects of the extinguishant 24. However, a passive sensor 32 may not experience a large $\Delta T$ (change in temperature), or other measured change besides temperature, when exposed to the extinguishant 24, and therefore may not provide high sensitivity. In contrast, when the sensor 32 is an active sensor, the sensor 32 may be maintained at an elevated or reduced temperature (or other parameter) compared to the ambient temperature, which can provide a relatively large $\Delta T$ (or other measured change). However, active sensors 32 require a power source which can increase costs and complexity.

In some embodiments, besides elevating or reducing temperature, active sensors 32 can also have voltages, currents, deflections, and the like, pre-applied thereto to increase their sensitivity. For example, when the sensor 32 is an active sensor, power can be transmitted into an element of the sensor 32, such as a resistance wire, or a thermistor, or a thermoelectric device such as a Peltier cooler, that has a predefined electrical resistance. The introduced power causes a change (either increase or decrease) in the steady state temperature of the sensor 32 which contrasts with the temperature effects of the extinguishant 24.

In some embodiments, the sensors 32 can take the form of active sensors including a heating or cooling element co-located with the sensing element itself, or separate from the sensing element. An example of the former is a thermistor which can be used both as a heating element and as a temperature sensor. An example of the latter is a heated metal plate that is positioned near a temperature sensor such as a thermocouple. In this configuration, unlike the thermistor, the heater element and temperature sensor are two separate components.

When the sensors 32 are active sensors, the sensors 32 can employ any of a number of methods or devices for increasing or decreasing the temperature of the sensor 32 to a temperature that is different from the temperature of the extinguishant 24. For example, heat may be added to or produced by the sensor 32 at a constant or varying rate until the sensor 32 reaches a steady state temperature. The amount of power that is input into the sensor 32 may be modulated by the controller(s) 17, 312 using a feedback system. However, in some embodiments, the amount of input power may not be modulated and may instead be relatively constant. The controller(s) 17, 312 can change the power provided to the sensor 32 based upon feedback which may be measured by sensor voltage, current, power, resistance, temperature, or combinations thereof.

Detection of the extinguishant 24, and properties thereof, can be accomplished by varying methods and means. For example, in some embodiments, the controller(s) 17, 312 examine measured data associated with the sensors 32, such as temperature and power supplied to the sensor 32 to maintain the sensor 32 at the desired temperature. The controller(s) 17, 312 can monitor this data or output from the sensors 32 for distinguishing features which suggest contact with the extinguishant 24. The distinguishing feature can be any of a number of metrics, such as a variation from a predicted, target temperature, or power provided to the sensor 32 to maintain a certain temperature, or other variables such as the raw output of a feedback temperature controller.

When the sensors 32 are active sensors, the difference in temperature between the extinguishant 24 and the sensor 32 can enable accurate sensing. However, the temperature of the extinguishant 24 and the ambient temperature may not be able to be controlled. These variables can affect the responsiveness of the sensors 32 since heat is drawn out of the sensors 32 at varying rates depending on ambient temperature and the temperature of the extinguishant 24. In some embodiments, the controllers 17, 312 can be configured to receive data relating to, and thereby account for, these variations. For example, the array 15 may include or be operatively coupled to an ambient temperature sensor to measure the ambient air temperature. The array 15 can also be configured to receive information relating to the extinguishant 24 temperature which can be entered in a calibration procedure. For example, the extinguishant temperature may be able to be detected using temperature sensors about which stagnant extinguishant 24 is placed by having the user create a pool of extinguishant prior to using the system 10, as part of a calibration process.

In some embodiments, each display panel 12 sends data relating to the power consumed by each sensor 32 to the associated controller(s) 17, 312, which in turn processes the data to extract information about directionality and magnitude of the extinguishant 24. Due to the fact that there may be multiple sensors 32 on the flat surface where extinguishant 24 is being sprayed, the position of the extinguishant 24 can be measured in a two-dimensional (2D) coordinate space or a three-dimensional (3D) coordinate space (e.g., to account for different positional relationships between display panels 12, i.e., tilted panels 12, panels 12 that are out of plane with each other, etc.). Magnitude or weight assigned to the sensors 32 can be determined based on the output or distinguishing feature for each sensor 32 which can be, for example, the output of a controller 17 for the display panel 12.

Each controller 17, 312 may receive information from the sensor system 30 to determine a centroid of the extinguishant 24, including information from an outer edge of the outermost elements 11' of an adjacent display panel 12, which in turn can be used to determine the extinguishing effect of the extinguishant 24. The magnitude of the output of each sensor 32 can be used as a “weight” for calculating the centroid of the extinguishant 24. For example, in a simple example the sensor system 30 may take the form of three sensors 32 arranged collinearly on a display panel 12. If the right-most sensor 32 provides an output of significantly greater magnitude (or otherwise indicating the presence of a greater amount of extinguishant 24) than either the center or left sensors 32, the controller(s) 17, 312 can conclude that the centroid of the extinguishant 24 is on the right side of the display panel 12, and use relative proportions to determine the left/right or lateral location of the centroid. The up/down or vertical location of the centroid can be similarly located. It should be understood, of course, that sensor 32 locations are not restricted to a line arrangement and can in fact be mounted anywhere on a two-dimensional plane, or even positioned on different planes in three-dimensional space.

The amount or volume of expelled extinguishant 24 can also be determined by the controller(s) 17, 312 by considering the collective magnitudes of the outputs of all sensors 32. The controller(s) 17, 312 may thus be able to determine the exact location of the centroid and the amount of extinguishant and dynamically adjust the displayed fire 16 accordingly.

The controller(s) 17, 312 may be able to ascertain the location, magnitude and effect of the applied extinguishant 24 in various other manners besides determining the centroid of the extinguishant 24. For example, the total surface area of a display panel 12 upon which the extinguishant 24 is impinging, or the envelope of impact 38, can be determined by the system 10/sensors 32/controllers 17, 312. In order to determine the envelope of impact 38, the system 10 may be able to determine at least part of the outer perimeter of the envelope of impact 38, and extrapolate the remainder of the perimeter. For example, the system 10 may be able to determine the part of the outer perimeter of the envelope of impact 38 is an arc, and then extrapolate the remainder of the arc/circle to determine the envelope of impact (in some cases, accounting for a “sagging” force provided by gravity), and therefore the location of applied extinguishant 24, and/or which regions or elements 11 are experiencing the extinguishment 24, or upon which the extinguishant 24 is positioned.

In some embodiments, the location of the extinguishant 24 directed onto the display panel(s) 12 can be determined in the 2D or 3D plane of the display panel(s) 12 based on the weight or magnitude of output provided by each sensor 32. For instance, spraying the top left of a display panel 12 with extinguishant 24 will cause sensors 32 near the top left of the panel 12 to exhibit a higher output power and the output as the sensors 32 try to maintain the pre-set temperature. In contrast, sensors 32 more distant from the extinguishant location will not exhibit this effect with comparable magnitude. The controller(s) 17, 312, knowing the coordinates of the discrete sensors 32 and their associated outputs/weights, can then determine the centroid location of the extinguishant 24.

Magnitude of extinguishant 24 can also be determined by a summation of the magnitudes of the output/distinguishing feature of the sensors 32, for example, the summation of power injected into all sensors 32. The displayed fire 16 can then be adjusted by the controller(s) 17, 312 as desired.

This system for monitoring the applied extinguishant 24 enables the system 10 to naturally correspond to the effect of fighting an actual fire. A water can extinguisher, for example, displaces much less water at much less pressure than a fire fighter handline. A handline is more effective at cooling the fire because of the higher pressure. A larger percentage of sensors 32 on the panel 12 would be expected to be affected by the handline than by a water can extinguisher. In some embodiments, sensors 32 can also exhibit distinguishing features of higher magnitude due to the increased cooling action which will cause the summation of cooling for the handline to be much larger than the summation of cooling for a water can extinguisher. Thus, the system 10 can adjust to and automatically accommodate different types of extinguishants applied in differing manners, and provide accurate and realistic simulations that mirrors real world results.

The sensor system 30 can include solid-state sensors 32 without moving parts to provide a robust, sensitive sensor system 30 integrated into the display panel(s) 12 that accurately measures trainee performance, without the use of actual flame or fires. The sensor system 30 also enables realistic training exercises in which trainees 20 can train with high pressure extinguishants which can mirror real-life firefighting scenarios. In addition, the sensors 32 can be positioned directly on/in the display panels 12 such that the sensors 32 are low profile and are not visible to the trainee 20, particularly during training exercises, so that the trainee 20 cannot intentionally target the sensors 32 without also targeting the displayed fire image 16.

Since the sensors 32 are positioned directly on the display panel 12 with the displayed image 16 underlying/surrounding the sensors 32, the sensors 32 enable a simulation that is highly indicative of how an actual fire would respond to the application of an extinguishant 24. The sensors 32 can be positioned in different portions of the display panel 12 (e.g., spaced away from the outer edges of the display panel 12 in some embodiments) and integrated into the fire image 16 such that the fire image 16 surrounds the sensor 32 on all sides. The flameless firefighting system 10 can thereby offer a training experience to similar live burns without the challenges of live burns.

The controller(s) 17, 312 can be configured to display a partial or entire flame pattern to the trainee 20, or provide natural flame growth based upon fire growth algorithms. In some embodiments, for example, a user may be able to identify a particular location on the display panel 12, such as pointing via an electromagnetic-emitting remote control, and indicate that a fire should be initiated at the indicated location to trigger the fire which can grow naturally based upon predetermined fire growth algorithms implemented by the controllers 17, 312. Alternately, or in addition, controller (s) 17, 312 may be able to be controlled by a human operator/trainer to adjust fire conditions on demand, or to change underlying fire conditions on demand which will eventually result in changed flame conditions. The controller (s) 17, 312 can also be coupled to external simulated sources of the heat, smoke, flame, gases, combustion sounds and/or combustion smells (not shown), which can also be actuated and controlled in accordance with the displayed fire image 16.

Proper firefighting techniques (e.g., where extinguishant 24 is aimed at the proper locations for the proper duration and in proper methods) can cause the controller(s) 17, 312 to reduce the size of the displayed flames/fire image 16, and/or cause the displayed flames/fire image 16 to grow at a reduced rate. Conversely, relatively poor firefighting technique (i.e. where extinguishant 24 is not aimed at the proper locations or for improper durations or in improper methods) can cause the controller(s) 17, 312 to increase the size of the displayed flame/fire image 16, and/or cause the displayed flame/fire image 16 to grow at an increased rate.

The output of each sensor 32 can be provided to the controller(s) 17, 312. In some embodiments, each sensor 32 can be assigned to and/or monitor a particular "zone" or pixel (or group or subset of pixels), such as those associated with a region or element 11, on the display panel 12. Alternately, each display panel 12 can be its own zone, or multiple display panels 12 and/or part thereof can be combined to define a zone. The data associated with each zone, including data relating to displayed fire image 16 and/or sensed extinguishant 24, can be combined, tracked and/or processed separately, if desired. The output of each sensor 32 can include information from sensors 32 positioned at or along the outer edge/perimeter of the display panel 12 (e.g., the outer-most sensors 32) and/or sensors 32 associated with the outermost regions or element 11' (shown as shaded outermost regions or elements 11' in FIG. 1 for illustrative purposes).

Each display panel 12 can also include a plurality of display or visual, processing, sensing, and control subsystems 13*a*, 13*b*, 13*c* that are operatively coupled to each other via the controller(s) 17, 312 or otherwise. As shown in FIG. 1, the subsystems 13*a*, 13*b*, 13*c* are schematically illustrated and can be visualized as different layers along the front (display) surface of the associated display panel 12. However the subsystems 13 may or may not be different or discrete physical layers, and may in fact be located at the same or overlapping locations in the depth direction, and the subsystems 13*a*, 13*b*, 13*c* are shown as different layers in FIG. 1 primarily for ease of visualization/conceptualization.

Each display panel 12 can include a visual subsystem 13*a* can include or take the form of an array of pixels of the display panel 12 that can be controlled to display visible light of various intensities, color, etc. (as will be described in greater detail below). In some embodiments, the visual subsystem 13*a* includes or takes the form of a LED or OLED display or panel or other technologies such as CRT, digital light processing, etc. Each display panel 12 can also include a sensor subsystem 13*b* (e.g., sensor system 30 described above) that includes or takes the form of a series of sensors 32 spaced in an array (in one case) across the display panel 12 (as will be described in greater detail below). The display panel 12 can also include a control or processing subsystem 13*c* that may include a network of intercommunication connectors, such as communication cables or wires for providing the control signals, display signals, and the like, from the other subsystems 13*a*, 13*b* to each other, and/or to the controller(s) 17, 312.

As shown in FIG. 1, each subsystem 13*a*, 13*b*, 13*c* and/or the data relating to the modeled fire can be broken down into elements 11 wherein one case each elements 11 represents or corresponds to a certain surface area and/or certain pixels of the display area of each panel 12. Thus each element 11 can represent or corresponding to a unique surface are or portion of the panel, and the grid of elements 11 can essentially cover each panel 12 and/or the display portion thereof. Each element 11 can cover a predetermined number of pixels of the visual subsystem 13*a* (e.g., a grid of pixels or even down to a single pixel). The data associated with each element 11 can be tracked as and modified as part of the modeled fire/data, and tracked/modified by the associated controller 17 in one case, and/or the central controller 312 if desired. For example a LED display panel 12 may include 480×640 pixels, or 720×1280 pixels, or 1080×1920 pixels, or 2160×3840 pixels, or any other desired number of pixels. Each pixel can be assigned or counted as an element 11 of the visual subsystem 13*a* as desired. Alternatively, various adjacent pixels can be grouped together as elements 11.

For the modeled fire and/or sensor subsystem 13*b*, various adjacent pixels of the visual subsystem 13*a* (for example, groups of nine pixels of the visual subsystem 13*a*) can be grouped together to form larger elements 11. In this case, for example, if the visual subsystem 13*a* includes 480×640 elements, or 720×1280 elements, or 1080×1920 elements, or 2160×3840 elements, the modeled fire and/or sensor subsystem 13*b* can include about 53×71 elements, or 80×132 elements, or 120×213 elements, or 240×427 elements by way of example. Thus in FIG. 1 for illustrative purposes the visual subsystem 13*a* is shown as having more elements 11 (and/or a higher density of elements 11) than the sensor subsystem 13*b*. The control subsystem 13*c* can have elements 11 based on the number of elements 11 of the visual subsystem 13*a* and/or sensor subsystem 13*b* and/or modeled fire, but is shown in FIG. 1 as having the same number of elements 11 as the sensor subsystem 13*b*.

Figure 2:
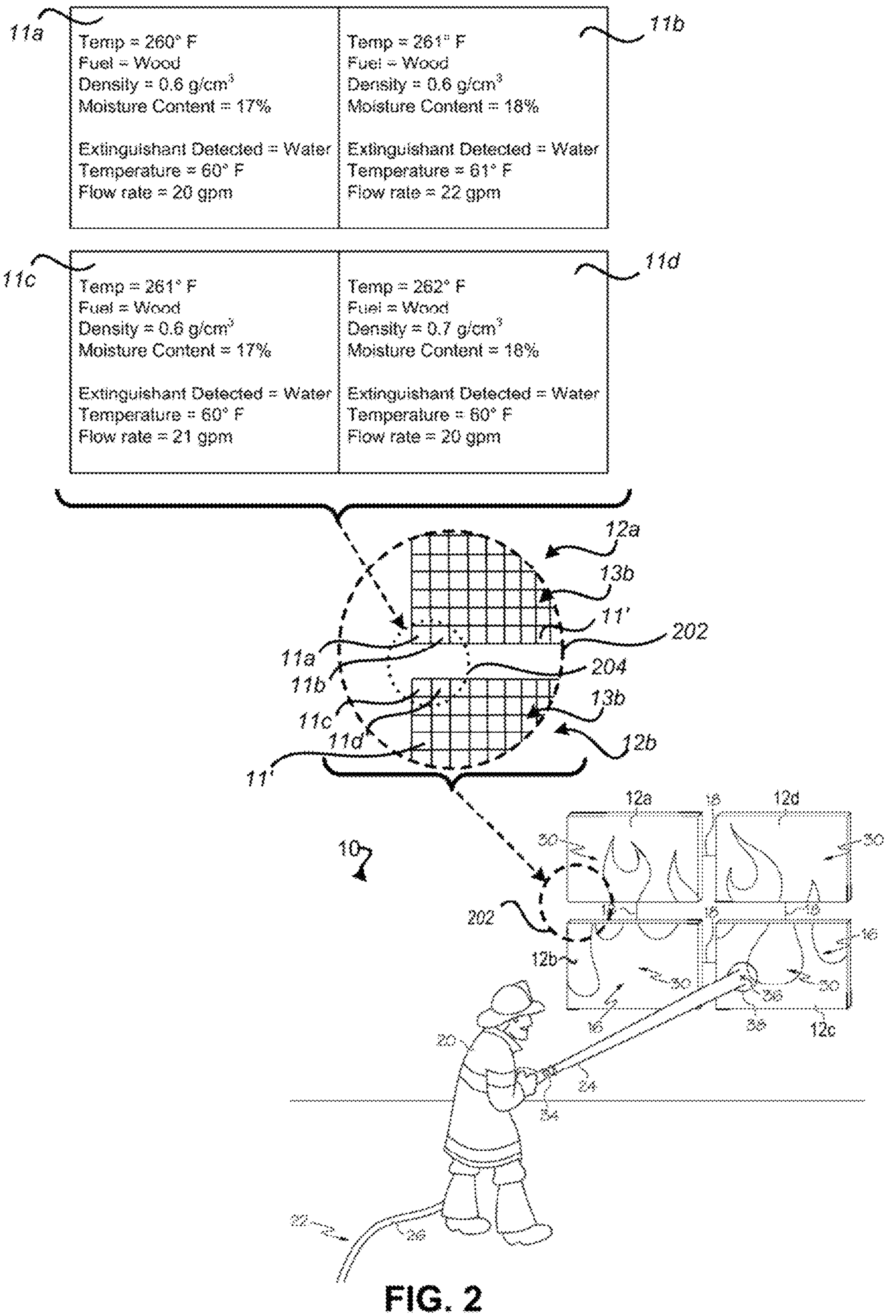
FIG. 2 is another a schematic representation of the training system of FIG. 1, showing illustrative data at various elements or pixels of the display panels.

With reference to FIG. 2, area 202 illustrates an area that includes a lower portion of display panel 12*a* and an upper portion of panel 12*b*. In the illustrated embodiment the panels 12*a*, 12*b* are slightly spaced apart, but it should be understood that alternatively the panels 12*a*, 12*b* could be directly touching each other such that there is no space or gap between the panels 12*a*, 12*b*. Area 204 of FIG. 2 (e.g., an example area within area 202) schematically illustrates an example of how data may be tracked and/or assigned to each element 11 of the modeled fire and/or sensor subsystem 13*b* of the panels 12*a*, 12*b*.

For example, elements 11*a* and 11*b* are associated with display panel 12*a*, and elements 11*c* and 11*d* are associated with display panel 12*b*. As illustrated in FIG. 2, each sensor element 11 of the modeled fire and/or sensor subsystem 13*b* can include, track, or have assigned to it various data such as temperature, a type of fuel, density, moisture content, a detected extinguishant (if applicable), an extinguishant temperature, and an extinguishant flow rate. However the data associated with the regions/elements 11 in FIG. 2 are included for illustrative purposes, and the actual data as used can vary from that shown. Each region/element 11 can be considered to be a data point or element of the modeled fire, such that modeled fire is broken down into finite elements.

Figure 3:
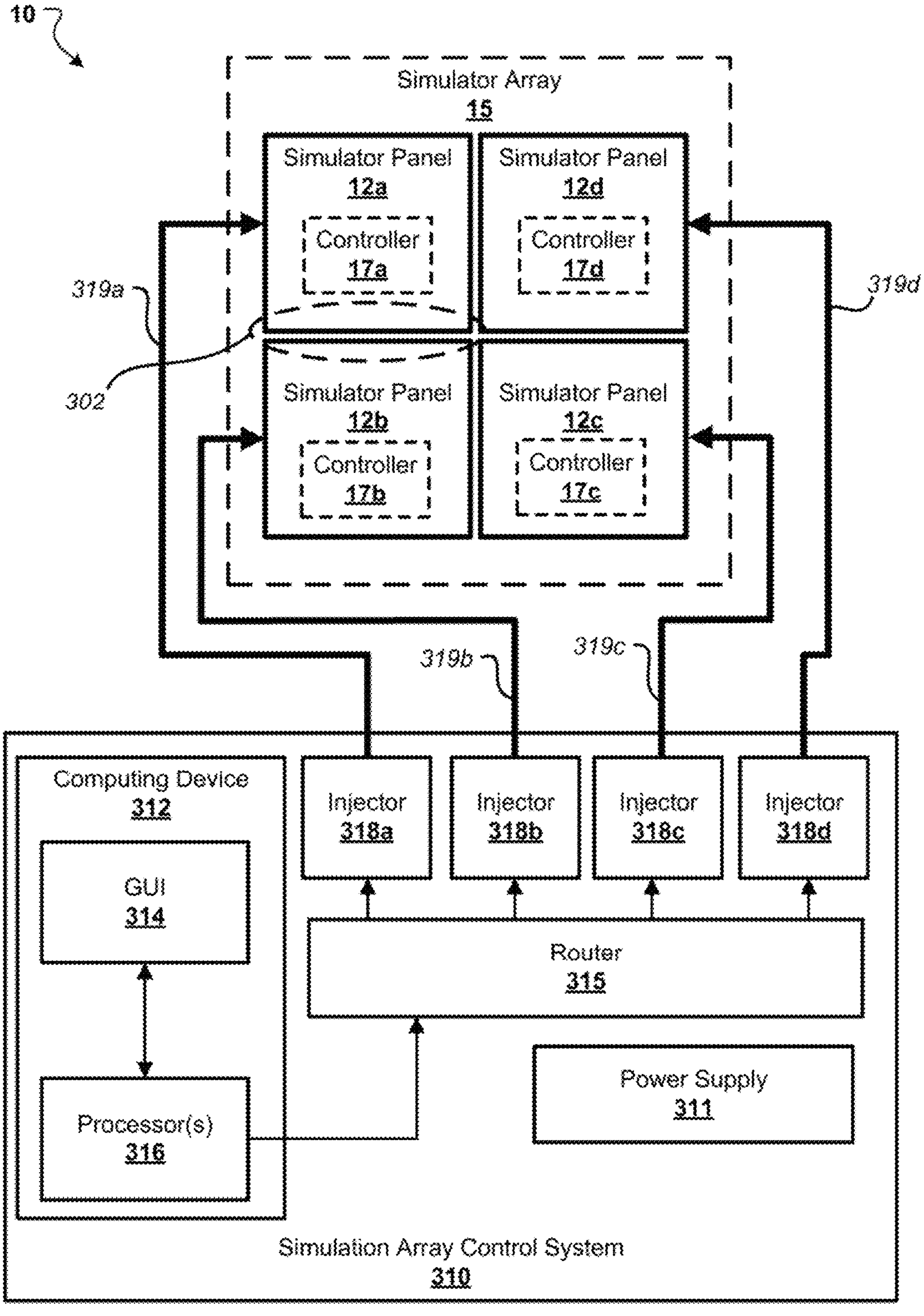
FIG. 3 is a block diagram of a training system that includes an array of display panels.

FIG. 3 is a schematic block diagram of the training system 10 of FIGS. 1 and 2. In particular, FIG. 3 schematically illustrates system 10 of FIG. 1 including the array 15 and/or each panel 12 operatively coupled to a simulation array control system 310. In an exemplary embodiment, the simulation array control system 310 includes a computing device/controller 312, one or more power injectors 318 for each display panel 12, and power supply 311. As illustrated, the simulation array control system 310 of FIG. 3 includes four power injectors 318*a*, 318*b*, 318*c*, 318*d*, each coupled to as associated display panel 12*a*, 12*b*, 12*c*, and 12*d* via an associated power injection cable 319*a*, 319*b*, 319*c*, 319*d*. The power injectors 318 are configured to supply power to an associated display panel 12 from a power supply 311 and a control signal from the controller 312. Because there are multiple power injectors 318 and display panels 12, a router 315 is used to disseminate a control signal from the controller 312 to each display panels 12 via the power injectors 318. The power injector(s) 318 enables data and power to be provided via a single cable. However it is noted that the system 10 and/or each panel 12 need not necessarily include a power injector 318. In some cases an alternate system or components can be utilized, such as using a two or more cables to provide/deliver both data and power and/or wireless data transfer (i.e. a single power cable with data transferred via Wi-Fi or the like).

Figure 5:
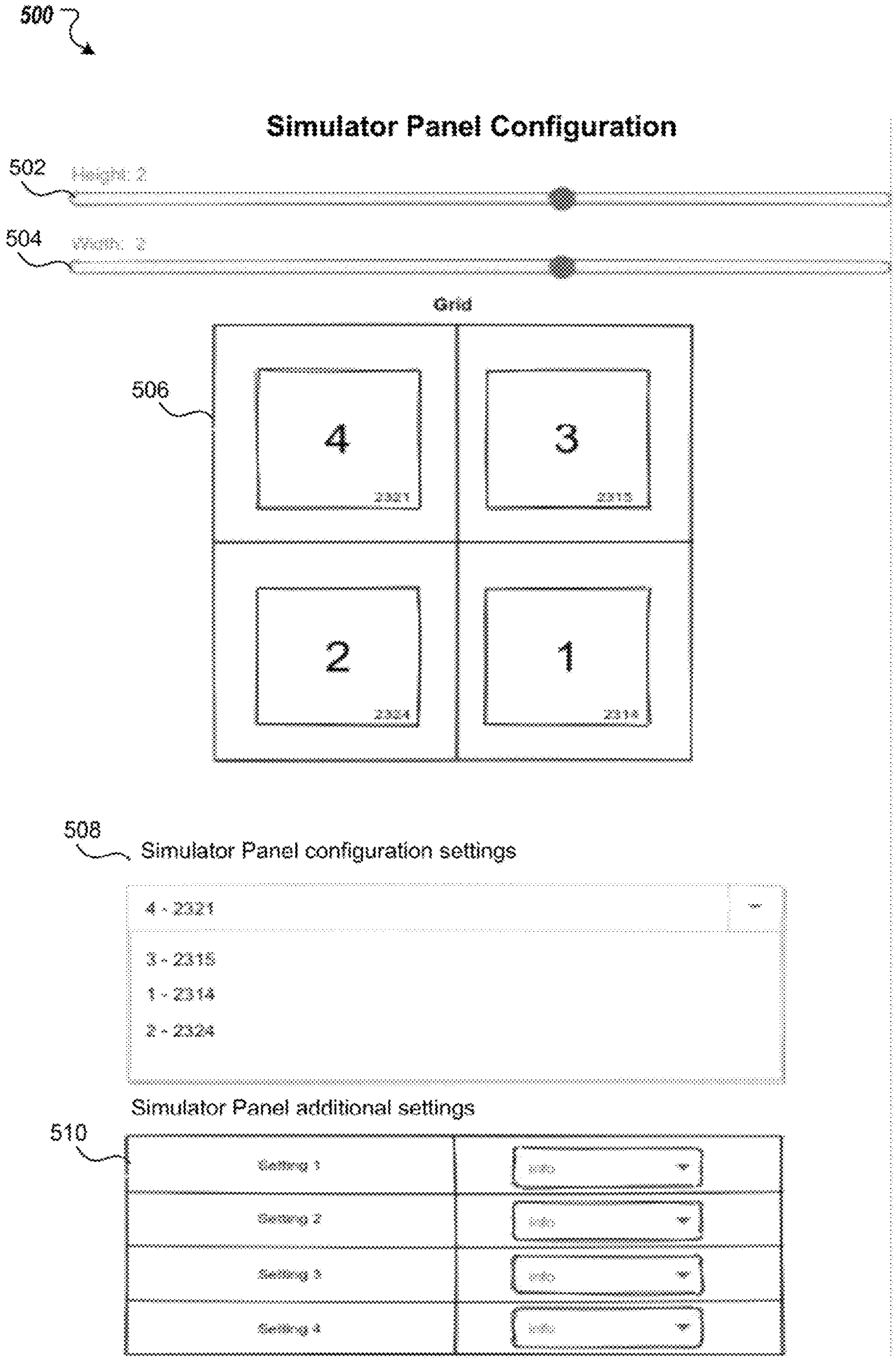
FIG. 5 is a sample graphical user interface of a training system that includes an array of display panels.
Figure 6:
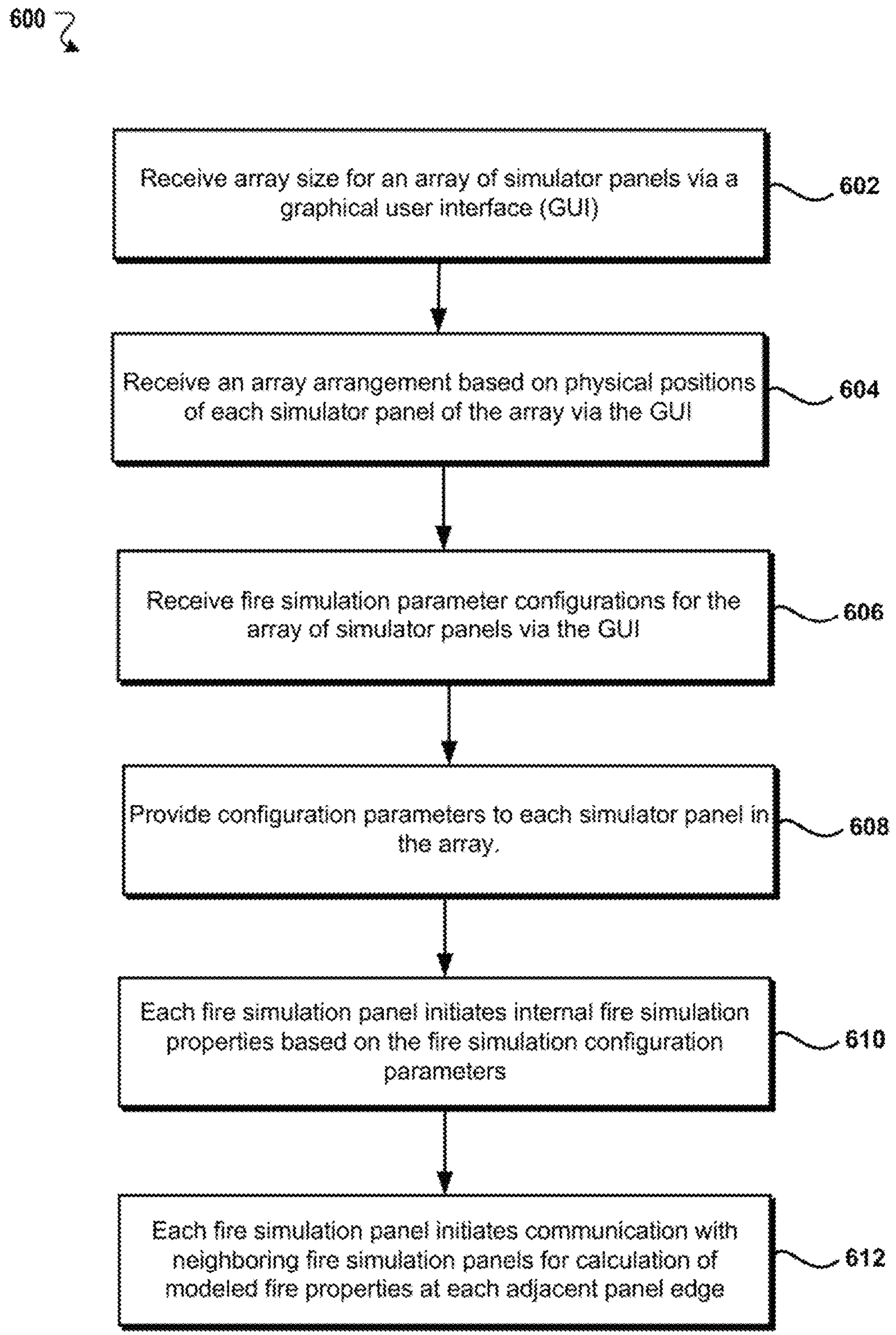
FIG. 6 is a flowchart of a process for providing a fire simulation with a training system that includes an array of display panels via a graphical user interface.

The computing device/controller 312 can include one or more processor(s) 316, and a graphical user interface (GUI) 314, which is further described herein with reference to FIGS. 5 and 6. The one or more processor(s) 316 are configured to coordinate the exchange of edge data (e.g., data associated with outermost elements 11' of the modeled fire and/or sensor subsystem 13*b*) between and among the array of display panels 12. In some implementations, the one or more processor(s) 316 control the configuration process for setting up the number of display panels 12 via the GUI 314 and coordinate the exchange of edge data of the fire simulation between the array 15 of display panels 12.

In some implementations, the one or more processor(s) 316 receive outputs from the one or more sensors 32 of a sensor system 30 of each display panel 12, and responsively controls the execution of the fire simulation with the displayed image 16 on each display panel 12 (e.g., operates as a central controller). Additionally, the one or more processor(s) 316 may be configured to monitor output of the sensors 32 of each display panel 12 such that proper use of the extinguishant 24, as determined by the one or more processor(s) 316, causes the one or more processor(s) 316 to reduce the size of modeled fire or the simulation (e.g., fire image 16) displayed by the display portion of each display panel 12.

FIG. 3 further illustrates an example area 302 of two display panels 12*a* and 12*b* that share adjacent edges (e.g., the same as or analogous to area 202 of FIG. 2). For example, edge data (data associated with outer or outermost regions/elements 11' of the modeled fire and/or sensor subsystem 13*b* and/or other subsystems 13) between display panels 12 can be shared. The edge data that can be shared includes any pertinent data, including data relating to qualities of the fire, fuel, extinguishant, or any other tracked information, at each region/element 11 as tracked by the associated controller(s) 17, 312, such as temperature, fuel source, applied extinguishant, volatility, direction heading, fuel content, etc., historical data relating to the same, and in some case such data relating to adjacent elements 11.

For example, an extinguishant 24 applied to display panel 12*a* would not affect the fire simulation of display panel 12*b* if they were configured as standalone display panels, or if the panels 12 are spaced sufficiently apart. However, adjacent edge data between adjacent display panels 12 can be shared via the one or more processor(s) 316, which can in turn receive data from each display panel controller 17. Thus, if a extinguishant 24 is applied to display panel 12*a* that is determined to flow to and/or cool the shared edge of area 302, then that updated physics data/modeled fire data (e.g., coolant data), can be sent to the controller 17*b* of display panel 12*b* to apply the updated physics data/modeled fire data accordingly along display panel 12*b*'s respective edge (and, directly or indirectly, more inwardly-positioned regions/elements 11). Once edge data is applied to a display panel 12, the data can cause other changes further along the interior of that display panel 12 (e.g., at portions spaced away from the outermost region/element 11').

In this manner, the modeled fire and/or flame/fire image 16 can grow/expand or shrink/contract across multiple display panels 12, and data relates to fuel, flame, fire, extinguishants, and other data or physics relating to the simulated fire/modeled fire as outlined above can be shared across multiple panel 12 due to the sharing of edge data. In one case, only edge data (e.g., data from the outermost regions/elements 11', or two or more outmost rows of regions/elements 11) is shared, and no interior data is shared, or meaningful amounts of interior data, to limit the amount of data to be shared to accommodate bandwidth restrictions. In some cases data other than edge data may be exchanged, such as fuel source information, sensor data, metadata, etc. but the edge data can comprise a majority or a great majority of data that is exchanged. In some cases, if desired the edge data can exclude the outer-most elements 11' but include, for example, the second outer-most elements 11' or other adjacent elements.

In one case the edge data constitutes or relates to data or information relating to some or all regions/elements/pixels 11' in the outer 75% of the surface area of a panel 12, or in the outer 90% in another case, or an outer 99% in another case, which surface area can include but need not necessarily include the outermost row/column or rows/columns of regions/elements/pixels 11', wherein in one case the "outermost" surface area is a band having a constant thickness and is evenly distributed about the outer perimeter. In another case the edge data constitutes or relates to data or information relating some or all regions/elements/pixels 11' located within 1% in one case, or 5% in one case, or 10% in another case, of a length and/or width of a panel 12, of the outer perimeter of the panel.

In one case at least about 80% in one case, or at least about 90% in another case, or at least about 95% in another case, or at least about 99% in another case, of transferred/ exchanged data between panels 12 is edge data (e.g. data relating to the outer or outer-most regions, elements or pixels 11'), in one case as measured by a percent of total bytes or bits of data over a period of time and/or as measured by bytes/frame measured over a period of time; where the period of time can be up to 0.1 second or, 0.5 second, or 1 second, or 10 seconds, 30 seconds, or the duration of the entire simulation/training.

Figure 4:
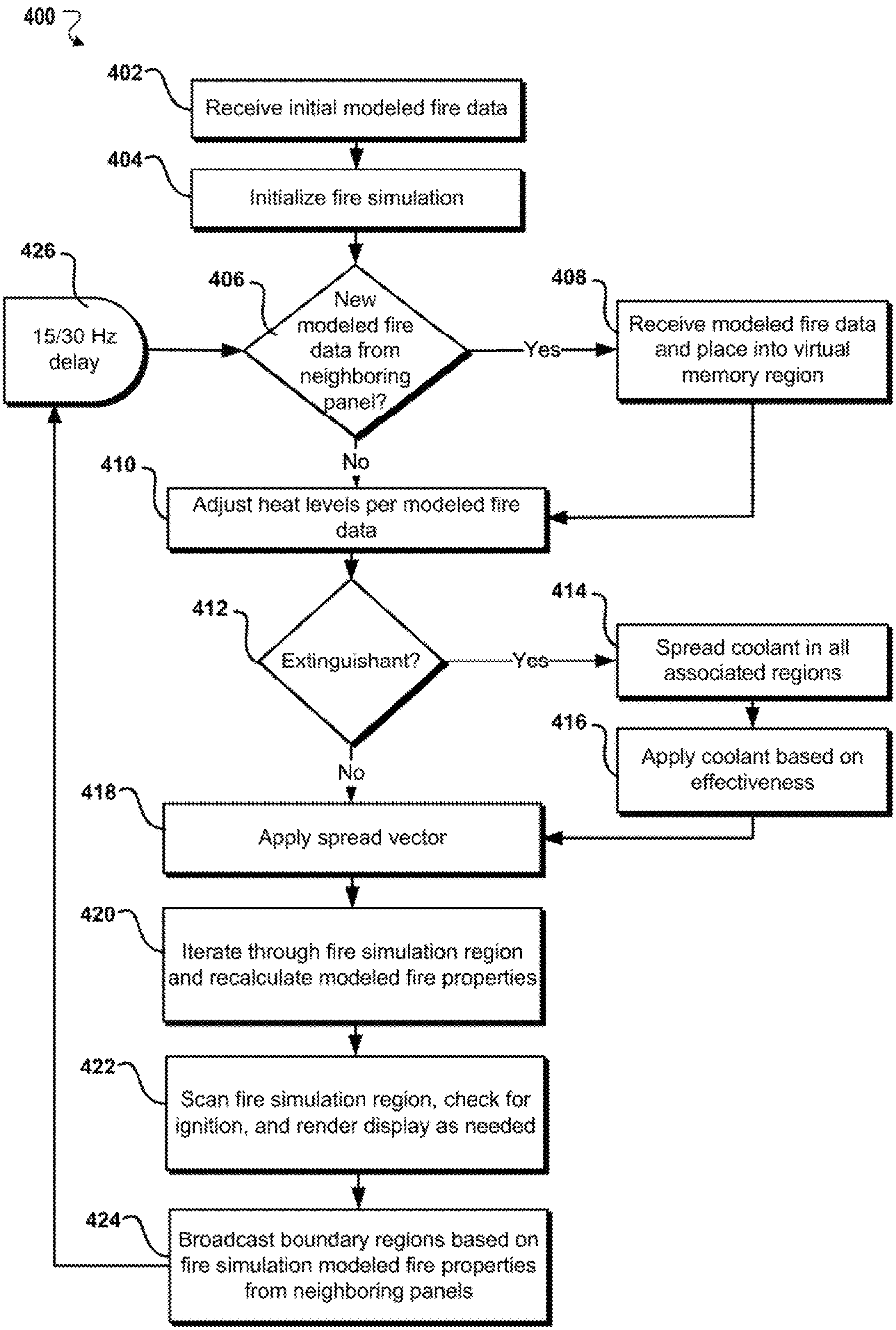
FIG. 4 is a flowchart of a process for providing a fire simulation with a training system that includes an array of display panels.

FIG. 4 is a flowchart of an example process 400 for providing a fire simulation on a display panel 12 with a training system that includes an array 15 of display panels 12. Operations of the process 400 can be implemented, for example, by a system that includes one or more data processing apparatus, such as a controller 17 for each display panel 12, or by one or more processor(s) 316. The process 400 can also be implemented by instructions stored on non-transitory computer storage medium, where execution of the instructions by a system that includes a data processing apparatus cause the data processing apparatus to perform the operations of the process 400.

A display panel controller 17 can receive an initial model of fire data for a fire simulation (402). For example, a user can enter fire simulation information into a GUI 314 to initiate a fire simulation across each display panel 12 of the array 15 of display panels.

The process 400 then initializes a fire simulation (404). The simulation may be initialized by seeding a panel 12 with a fuel source (e.g., data relating to a fuel source) at a customizable region. This step can involve telling the display panel controller 17 the location of the fuel source in the panel 12 (e.g., which pixels and/or elements 11 are occupied by the fuel source). The fuel source may have predefined and/or customizable quantities, such as rates of spread, cooling, and heating, as well as predefined and/or customizable ignition points. The fuel source can have a uniform rate of spread, cooling and heating, or differing values at differing locations. The initialization of a fire simulation can include an ignition of a portion of the fuel source to begin the fire simulation by initializing this subregion with a temperature above the ignition temperature.

The process 400 at step 406 then determines if there is new modeled fire data that is provided by/received from a neighboring display panel 12, particularly edge data. For example, the one or more controllers/processor(s) 17, 316 of the simulation array control system 310 can determine or be told which panel(s) 12 share edges with an adjacent neighboring display panel 12. At step 406, the process 400 determines if there is new data from a neighboring (edge shared) panel 12 available to be incorporated into the existing modeled fire data.

If the process 400 determines that there is new modeled fire data from a neighboring display panel 12, then the display panel 12 receives that modeled fire data and places the data into a virtual memory region (408). For example, a controller 17 for a display panel 12 can receive physics data/modeled fire data (e.g., fuel content and properties, temperatures, volatility, etc.) from a neighboring (edge shared) display panel 12, and place the added data into a virtual memory region. In the example of FIG. 2, the panel 12*a* receives data relating to or associated with at least elements 11*c* and 11*d*, and the panel 12*b* receives data relating to or associated with at least elements 11*a* and 11*b*.

If the process 400 determines if there is no new modeled fire data from a neighboring display panel 12, or after the new modeled fire data from the neighboring display panel 12 is placed into a virtual memory region, then the display panel 12 adjusts heat levels per modeled fire data (410). For example, step 410 can iterate through all of the elements 11 of the modeled fire and/or sensor subsystem 13*b* and adjust heat levels according to fuel source properties. For instance, heat can be increased or decreased according to volatility and availability of fuel. The change in heat levels can be a fixed amount or a random amount between a defined interval.

The process 400 at step 412 then checks for the presence of an extinguishant 24. For example, a display panel 12 can check for extinguishant 24 within bounds of the panel 12, and identify a location of an extinguishant 24 as an x,y coordinate (or x, y, z coordinate), as well as the spread of the cooling effect provided by the extinguishant according to a radius (r) or other perimeter. This information can, in one case, be provided by sensor system 30/subsystem 13*b* as described above.

If an extinguishant 24 is found at step 412 of the process 400, then the process 400 applies a coolant effect in all associated regions/elements 11 determined by being affected by the extinguishant (414) and applies the coolant effect based on a determined effectiveness (416). For example, the coolant effect can be spread to the elements 11 in all regions of the panel 12 where the coolant is or should be located from (x−r, y−r) to (x+r, y+r), according to the centroid (x,y) and radius, r, as defined previously. If desired, effects of gravity and flowing of the coolant can be taken into consideration. The coolant effect can be applied according to effectiveness which is dependent on how the type of coolant/extinguishant interacts with the specific fuel of the fire. Additionally, the process 400 for the fire simulation can include reducing fuel availability and decreasing heat in the regions where the coolant is applied as appropriate based on the coolant and fuel levels, which can decay or decrease over time if not replenished.

If no extinguishant is found at step 412, or following the process 400 after steps 414 and 416, the process 400 applies a spread vector (418). For example, a spread vector can be applied to the modeled fire by spreading heat, and possibly fuel, in the directions and magnitudes defined by the spread vector. The blending of neighboring elements or regions along this vector can be done in any number of methods, such as linear or Gaussian. In an exemplary implementation, the impact of the spread vector is applied continuously during a simulation. In some implementations, the frequency which the spread vector is applied may be periodically diminished which may overpower the frequency to which the spread vector has an effect during the simulation (e.g., the spread vector may have little to no effect). Although step 418 applies a "spread" vector, it should be understood that the process 400 at step 418 may determine that no spread of fire or heat is to be implemented, or the fire and/or heat is to be diminished instead of spread.

The process 400 then iterates through the fire simulation region(s) and recalculates modeled fire properties (420). For example, the display panels 12 and/or the displays therein are configured to recalculate fire properties/elements 11 based on new data relating to combustion levels, flame size, heat levels, and the like, as the fire simulation continues.

The process 400 then scans the fire simulation region of the modeled fire/elements 11 or displayed fire, checks for ignition, and renders display as needed (422). For example, the display panels 12 update each display region for the end user to visualize the updated fire simulation as it progresses during the fire simulation.

At step 424 the process 400 then broadcasts edge data/boundary region information based on fire simulation modeled fire properties from neighboring display panels 12. For example, as illustrated in FIG. 3, the one or more processor(s) 316 of the simulation array control system 310 can disseminate neighboring panel information from one panel 12*a* to an adjacent panel 12*b* regarding the shared edge data of each other's fire simulation data. For example, if display panel 12*a* senses an applied extinguishant 24, but display panel 12*b* does not, the controller 17*b* of display panel 12*b* would not be able to determine whether to cool the modeled fire properties, but for the shared data that display panel 12*a* did sense an extinguishant 24. Thus the shared edge between display panel 12*a* and display panel 12*b* (e.g., shared edge area 202) may include data that would cool the modeled fire for display panel 12*b* at least along that edge based on the shared edge data with display panel 12*a*.

In addition, any cooling along the outer edge of the display panel 12*b* can be determined to propagate inwardly in the panel 12*b*, away from the shared edge, according to standard fire modelling processes as described above. In some cases, only data from the edges (e.g., elements 11 along the edges) is shared, and other modeled fire data is not shared between adjacent display panels 12. In this case the sharing of data between panels 12 is reduced due to limited bandwidth, and the sharing of data only along the edges can improve data transfer and processing speed. However, it should be understood that while in some cases the edge data that is shared is only the outermost edge data (e.g., edge data relating to the outermost row/column of elements 11), in other cases the edge data can be two outermost edges/columns or three outermost edges/columns, etc. The process 400 is then reiterated for each display panel to step 406 at a delay, in one case a 15 or 30 Hz delay (426), to determine whether new modeled fire data is received (e.g., edge data from a neighboring panel).

FIG. 5 illustrates an exemplary graphical user interface 500 of a training system that includes and/or controls an array 15 of display panels 12. Similar user interfaces are, optionally, implemented on controller 312 (e.g., GUI 314). Alternatively, GUI 314 may be implemented as a software solution installed on a client device. Further alternatively, GUI 314 may be web based and accessed on a web browser application.

In some embodiments, graphical user interface 500 includes the following elements, or a subset or superset thereof:

- Display panel height selection setting slide bar 502;
- Display panel width selection setting slide bar 504;
- Display grid 506 for displaying the selected display panel array configuration (e.g., 2×2 array 15 as illustrated in FIGS. 1 and 2);
- Display panel configuration settings drop down menu 508 for selecting the selected display panel array configuration; and
- Display panel additional settings drop down menu 510.

In some implementations, the additional settings drop down menu 510 may include fire behavior settings such as fire class, initial temperatures, spread vector radius, and the like. The additional settings drop down menu 510 may further include a source of an initial fire. For example, options may be provided for the user to choose a point of origin (e.g., where the fire will spread from).

However, various other inputs for selecting parameters such as display panel height, display panel width, display panel configuration, and display panel addition settings can be utilized, and the selected display panel array configuration can be shown in ways other than that shown in FIG. 5. Thus it should be noted that icon labels illustrated in FIG. 5 are merely exemplary. Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 6 is a flowchart of an example process 600 for providing a fire simulation with a training system that includes an array 15 of display panels 12 via a graphical user interface. Operations of the process 600 can be implemented, for example, by a system that includes one or more data processing apparatus, such as the one or more processor(s) 17, 316 of the simulation array control system 310 of FIG. 3. The process 600 can also be implemented by instructions stored on computer storage medium, where execution of the instructions by a system that includes a data processing apparatus cause the data processing apparatus to perform the operations of the process 600.

The process 600 receives an array size for an array 15 of display panels 12 via a graphical user interface (GUI) (602). For example, a user, via GUI 314, selects an appropriate array size based on the user's configuration of display panels, such as a 2×2 format as illustrated in FIGS. 1 and 2. The representations of each of the display panels 12 shown in the display grid 506 of FIG. 5 can be dragged and dropped in any of a variety of configurations, and additional panels 12 can be added. The controller 312 can then recognize the configuration of the panels 12 and determine for example which edges of the differing panels 12 are adjacent panels which should share data, and take the array configuration into consideration when determining qualities of the modeled fire, changes thereto, and sharing of data.

The user can interact with the display panel configuration settings drop down menu 508 of FIG. 5 for selecting the selected display panel array configuration. Thus, additional panels 12 can be added to the array 15 to provide a larger system 10 and/or composite image 16 which can be useful when it is desired to display a simulation for a larger fire or hazardous condition. Conversely, panels 12 can be removed to the array 15 to provide a smaller system 10 and/or composite image 16 which can be useful when it is desired to display a simulation for a relatively small fire or hazardous condition and/or when a smaller system 10/array 15 is needed due to space considerations, for improved portability, etc. Thus the system 10 is easily scalable to meet the needs of the trainee/simulation, and the sharing of edge data can help to enable the scalability by providing efficient data transfer and processing.

The process 600 receives an array arrangement based on physical positions of each display panel 12 of the array 15 is via the GUI (604). For example, a user can select a 2×2 configuration via the display panel configuration settings drop down menu 508, which is then displayed on the display grid 506.

The process 600 receives fire simulation parameter configurations for the array 15 of display panels 12 via the GUI (606) and provides configuration parameters to each display panel 12 in the array (608). For example, referring to FIG. 2, after receiving the configuration information for the array 15 of display panels 12 (e.g., including which panels 12 share adjacent edges, i.e., area 202 of FIG. 2), the one or more processor(s) 316 of the simulation array control system 310 can disseminate the appropriate adjacency edge data to each respective display panel 12*a*-12*d*.

Each display panel 12 can independently and autonomously initiate and carry out internal fire simulations/fire modeling based on the fire simulation configuration parameters (610). Each panel 12 can initiate communication with neighboring panels 12 for communication of modeled fire properties at each adjacent panel edge (612). For example, a controller 17*a* for display panel 12*a* receives the adjacency edge data for area 202 for display panel 12*b* from the one or more processor(s) 316, and vice versa.

FIG. 7 illustrates an example operating system 700 for a fire simulation with a training system that includes an array 15 of display panels 12 and a graphical user interface 500, according to embodiments of the invention. For example, as depicted in image 710, a user 702 (e.g., a fire simulation trainer) is accessing a simulation array control box 704 (e.g., houses a simulation array control system 310) via a user interface (e.g., GUI 500) to set up configuration data for the array 15 of display panels 12. The control box 704 can be operatively coupled to the array 15/panels 12/simulation array control system 310/controller 312 via a wired or wireless connection. As illustrated in the panel image 720 of FIG. 7, array 15 of display panels 12 illustrates an array of eight display panels 12*a*-12*h* (e.g., display panels 12 of FIGS. 1 and 2) in a 2×4 configuration (e.g., two columns and four rows). The user 702 via the simulation array control system 310 can initiate a fire simulation to display the fire simulation image 732, as illustrated in the panel image 730 by array 15 of display panels 12, according to methods described herein.

In some embodiments, as illustrated with array 15 of FIG. 7, each display panel 12 may be assigned 3D coordinates (x, y, z) as opposed to only 2D coordinates (x, y). For example, two display panels, 12*e* and 12*f*, in the array 15 of FIG. 7 are tilted at an angle (such as a 45-degree angle in one case) relative to a horizontal and/or vertical plane/frame of reference. With the 3D orientation of the panels 12*e*, 12*f* input by the user 702 and/or operator and provided to the simulation array control system 310 and/or display panel controllers 17, the calculations for the fire modelling, according to processes described herein, may be affected differently based on the heat and coolant physics based on the location of the fire, the location of the extinguishant 24, and the respective spread vectors for each (e.g., as heat rises through the display panels 12). In particular, fire and heat may spread more quickly in the vertically oriented panels 12*a*—d than the horizontally oriented panels 12*g*, 12*h*, to mimic real world behavior. The ability to enter 3D positioning coordinates of a display panel 12 with respect to neighboring display panels 12 allows the system to better simulate a real-world fire simulation, where the physics and modeled fire data can be manipulated accordingly based on the 3D coordinates of each display panel 12 (e.g., the way a coolant or heat may spread).

Thus the system 10 can track/configure the reference frame and/or orientation of each display panel 12. For instance, a fire or other hazardous condition can be configured to spread according to the x/y/z axis, and the flame would spread, behave and look differently, accordingly. Thus regardless of the orientation of the panels 12, the system may be able to track which direction is up relative to a gravitational frame of reference. The settings or controls for this feature may in some cases be hidden from the end-user due to its complexity, in which cases the system operator/administrator may be able to adjust such settings or controls, but in other cases the end-user may have the ability to access and adjust such settings or controls.

Generally, systems, methods, devices, and techniques are provided for implementing a training system for a fire simulation. The training system utilizes an array 15 of display panel 12. Each display panel 12 can be separately controlled, and the data representing the physics/physical condition/modeled fire (e.g., temperature, volatility, direction heading, fuel content, etc.) along the adjacent edge to of a neighboring panel 12 can be received and taken in consideration.

In some embodiments, a training system can include an array of display panels, each display panel including a display portion (e.g., visual subsystem that provides a visual output that can be visually perceived by the user/trainee), a front surface, a sensor system, and a display panel controller/control system. The display portion can include a plurality of regions (e.g., corresponding to a number of pixels in one case, or even a single pixel in another case) and can be configured to display a fire simulation, the display portion having at least one outer edge positioned adjacent (e.g., defined in one case as "situated near, close to, or adjoining," thus there may be a gap between adjacent panels and/or edges or they may be in contact; in one case an edge of a display portion can be considered to be "adjacent" to another edge when the two panel edges are the closest edges to each other that extend in the same direction, and may in some cases overlap partially or completely) to an outer edge of at least one adjacent display panel. The sensor system can include one or more sensors operatively coupled to the display panel and can be configured to detect at least one of a real or virtual extinguishant on or at the front surface of the display panel. The display panel control system can be operatively coupled to the sensor system and to the display portion. The display panel control system can be configured to determine qualities, at the plurality of regions, of a modeled fire, determine changes of the modeled fire based upon qualities of the modeled fire and inputs received from the sensor system, and cause the display portion to display the fire simulation based upon the modeled fire. The display panel control system can be further configured to provide data relating to the modeled fire at the outer edge to the at least one adjacent display panel, and to receive data relating to a modeled fire at an outer edge of the at least one adjacent display panel.

In some embodiments, a display system can include a plurality of display panels, each display panel being configured to display a portion of a simulated fire/fire simulation such that together the plurality of display panels display a composite fire image. Each display panel can have a display portion configured to display the portion of the simulated fire/fire simulation, at least one sensor configured to detect an extinguishant directed at the display portion, and a display panel controller operatively coupled to the display portion. The display panel controller can be configured to determine qualities of a modeled fire, determine changes of the modeled fire over time based upon qualities of the modeled fire and inputs received from the at least one sensor, and cause the display portion to display the portion of the simulated fire/fire simulation based upon the modeled fire. The display panel controller can be further configured to provide data relating to the modeled fire, at an outer edge of the display portion, to at least one adjacent display panel. Additionally, the display panel controller can be further configured to receive data relating to a modeled fire at an outer edge of the at least one adjacent display panel.

Figure 8:
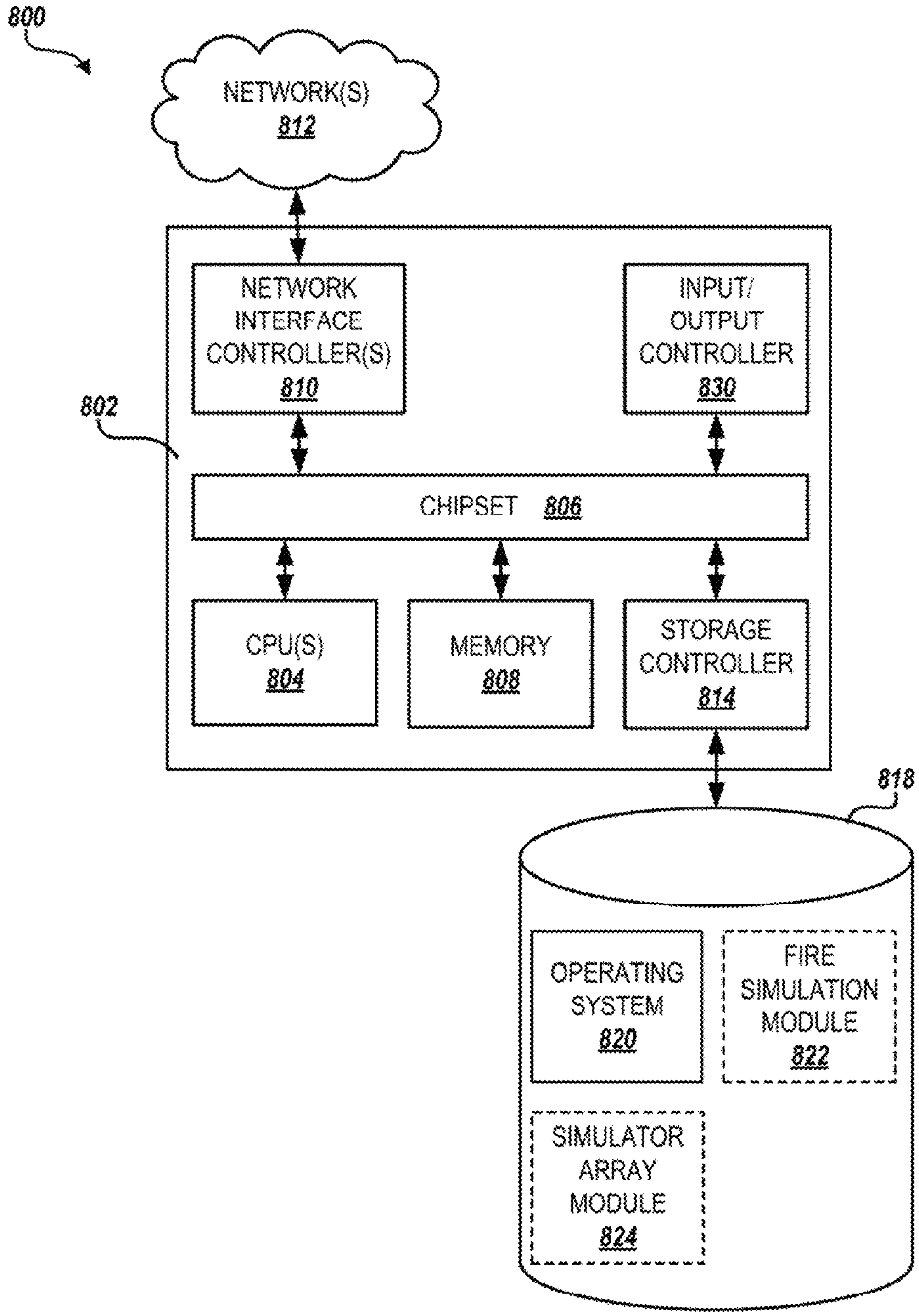
FIG. 8 is a block diagram of computer architecture for a computer capable of executing the software components described herein.

FIG. 8 illustrates an example computer architecture 800 for a computer 802 capable of executing the software components and processes described herein for the sending/receiving and processing of tasks for the CA components. The computer architecture 800 (also referred to herein as a "server") shown in FIG. 8 illustrates a server computer, workstation, desktop computer, laptop, or other computing device, and may be utilized to execute any aspects of the software components presented herein described as executing on a controller, processor, host server, or other computing platform. The computer 802 preferably includes a baseboard, or "motherboard," which is a printed circuit board to which a multitude of components or devices may be connected by way of a system bus or other electrical communication paths. In one illustrative embodiment, one or more central processing units (CPUs) 804 operate in conjunction with a chipset 806. The CPUs 804 can be programmable processors that perform arithmetic and logical operations necessary for the operation of the computer 802.

The CPUs 804 preferably perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 806 provides an interface between the CPUs 804 and the remainder of the components and devices on the baseboard. The chipset 806 may provide an interface to a memory 808. The memory 808 may include a random access memory (RAM) used as the main memory in the computer 802. The memory 808 may further include a computer-readable storage medium such as a read-only memory (ROM) or non-volatile RAM (NVRAM) for storing basic routines that that help to startup the computer 802 and to transfer information between the various components and devices. The ROM or NVRAM may also store other software components necessary for the operation of the computer 802 in accordance with the embodiments described herein.

According to various embodiments, the computer 802 may operate in a networked environment using logical connections to remote computing devices through one or more networks 812, a local-area network (LAN), a wide-area network (WAN), the Internet, or any other networking topology known in the art that connects the computer 802 to the devices and other remote computers. The chipset 806 includes functionality for providing network connectivity through one or more network interface controllers (NICs) 810, such as a gigabit Ethernet adapter. For example, the NIC 810 may be capable of connecting the computer 802 to other computer devices in the utility provider's systems. It should be appreciated that any number of NICs 810 may be present in the computer 802, connecting the computer to other types of networks and remote computer systems beyond those described herein.

The computer 802 may be connected to at least one mass storage device 818 that provides non-volatile storage for the computer 802. The mass storage device 818 may store system programs, application programs, other program modules, and data, which are described in greater detail herein. The mass storage device 818 may be connected to the computer 802 through a storage controller 814 connected to the chipset 806. The mass storage device 818 may consist of one or more physical storage units. The storage controller 814 may interface with the physical storage units through a serial attached SCSI (SAS) interface, a serial advanced technology attachment (SATA) interface, a fiber channel (FC) interface, or other standard interface for physically connecting and transferring data between computers and physical storage devices.

The computer 802 may store data on the mass storage device 818 by transforming the physical state of the physical storage units to reflect the information being stored. The specific transformation of physical state may depend on various factors, in different embodiments of the invention of this description. Examples of such factors may include, but are not limited to, the technology used to implement the physical storage units, whether the mass storage device 818 is characterized as primary or secondary storage, or the like. For example, the computer 802 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 802 may further read information from the mass storage device 818 by detecting the physical states or characteristics of one or more particular locations within the physical storage units.

The mass storage device 818 may store an operating system 820 utilized to control the operation of the computer 802. According to some embodiments, the operating system includes the LINUX operating system. According to another embodiment, the operating system includes the WINDOWS® SERVER operating system from MICROSOFT Corporation of Redmond, Wash. According to further embodiments, the operating system may include the UNIX or SOLARIS operating systems. It should be appreciated that other operating systems may also be utilized. The mass storage device 818 may store other system or application programs and data utilized by the computer 802, such as a fire simulation module 822 to manage a fire training simulation on a respective display panel, and/or a array module 824 to manage the configuration of a plurality of display panels 12 and the respective GUI, according to embodiments described herein.

In some embodiments, the mass storage device 818 may be encoded with computer-executable instructions that, when loaded into the computer 802, transforms the computer 802 from being a general-purpose computing system into a special-purpose computer capable of implementing the embodiments described herein. These computer-executable instructions transform the computer 802 by specifying how the CPUs 804 transition between states, as described above. According to some embodiments, from the host server 106 perspective, the mass storage device 818 stores computer-executable instructions that, when executed by the computer 802, perform portions of the process for determining optimal node allocation during a plurality of time intervals of a given time period, as described herein. In further embodiments, the computer 802 may have access to other computer-readable storage medium in addition to or as an alternative to the mass storage device 818.

The computer 802 may also include an input/output controller 830 for receiving and processing input from a number of input devices, such as a keyboard, a mouse, a touchpad, a touch screen, an electronic stylus, or other type of input device. Similarly, the input/output controller 830 may provide output to a display device, such as a computer monitor, a flat-panel display, a digital projector, a printer, a plotter, or other type of output device. It will be appreciated that the computer 802 may not include all of the components shown in FIG. 8, may include other components that are not explicitly shown in FIG. 8, or may utilize an architecture completely different than that shown in FIG. 8.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically includes computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "comprised of" or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept. Having described the invention in detail and by reference to the various embodiments, it should be understood that modifications and variations thereof are possible without departing from the scope of the claims of the present application.

What is claimed is:

1. A system comprising:

a plurality of display panels, each display panel being configured to display a portion of a simulated fire such that together the plurality of display panels display a composite fire image, each display panel having:

a display portion configured to display the portion of the simulated fire;

at least one sensor configured to detect an extinguishant directed at the display portion; and a display panel controller operatively coupled to the display portion, the at least one sensor, and the display panel controller of at least one other display panel, wherein the display panel controller is configured to:

at least partially determine qualities of a modeled fire;

determine changes of the modeled fire based upon inputs received from the at least one sensor; and cause the display portion to display the portion of the simulated fire based upon data or properties of the modeled fire, wherein the display panel controller is configured to provide data corresponding to the modeled fire only at positions that correspond to an outer edge of the display portion, to at least one adjacent display panel, and wherein the display panel controller is configured to receive data corresponding to a modeled fire from at least one adjacent display panel.

2. The system of claim 1 wherein the modeled fire includes a set of data corresponding to an array of elements, each element corresponding to a position on the display portion, wherein the set of data for each element relate to at least one of fire temperature, ambient temperature, type of fuel, fuel density, fuel moisture content, detected extinguishant, extinguishant temperature, extinguishant flow rate, extinguishant volatility or extinguishant heading.

3. The system of claim 2 wherein the data corresponding to the modeled fire at positions that correspond to the outer edge of the display portion includes data for each element corresponding to a position at an outer perimeter of the display portion.

4. The system of claim 2 wherein the display portion includes a plurality of pixels, and wherein each element corresponds to a group of the plurality of pixels.

5. The system of claim 1 wherein the system is configured such that an effect of an extinguishant applied to a first display panel is provided to the controller of a second display panel to which the extinguishant is not applied.

6. The system of claim 1 wherein the display panel includes an array of sensors positioned across the display portion.

7. The system of claim 1 wherein the extinguishant is at least one of a real, virtual or simulated extinguishant.

8. The system of claim 1 wherein the data corresponding to the modeled fire at positions that correspond to the outer edge of the display portion, corresponds to positions at an outer-most edge of the associated display portion.

9. The system of claim 1 wherein the data corresponding to the modeled fire at positions that correspond to the outer edge of the display portion constitutes data corresponding to positions at an outer 90% of a surface area of the display portion.

10. The system of claim 1 wherein the display panel controller is not configured to provide data corresponding to the modeled fire, at positions other than at the outer edge of the display portion, to the at least one adjacent display panel.

11. The system of claim 1 wherein the display panel controller is configured such that at least 99% of the data provided by the panel to the at least one adjacent panel corresponds to data corresponding to the outer edges of the display portion over a period of ten seconds.

12. The system of claim 1 further comprising a user interface operatively coupled to each display panel controller, wherein the user interface is configured to receive as an input, from a user, information relating to a size and arrangement of an array of display panels, and wherein each display panel controller is configured to accommodate the inputted size and arrangement information when at least one of at least partially determining the qualities of the modeled fire or sharing data with adjacent display panels.

13. A method comprising:

providing access to a plurality of display panels, wherein each display panel is displaying, on a display portion thereof, a portion of a simulated fire such that together the plurality of display panels display a composite fire image, each display panel having at least one sensor and a display panel controller operatively coupled to the display portion and the at least one sensor, wherein the display controller at least partially determines qualities of a modeled fire which at least partially determines a display of the simulated fire;

at least one sensor of one of the display panels detecting an extinguishant directed at the associated display portion;

the controller of the associated display panel determining changes in the modeled fire, based upon input received from the at least one sensor;

the controller of the associated display panel causing the associated display portion to change the display of the portion of the simulated fire based on the determined changes; and the controller of the associated display panel providing only part of the data corresponding to the modeled fire, to at least one adjacent display panel.

14. A system comprising:

an array of display panels, each display panel comprising:

a display portion configured to display a simulated fire and including a plurality of regions;

a sensor system configured to detect an extinguishant on a front surface of the display panel; and a display panel controller operatively coupled to the sensor system and to the display portion, wherein the display panel controller is configured to:

at least partially determine qualities, at the plurality of regions, of a modeled fire;

determine changes of the modeled fire based upon inputs received from the sensor system;

cause the display portion to display the simulated fire based upon the modeled fire; and provide data corresponding to the modeled fire at positions at an outer edge of the display portion to at least one adjacent display panel, wherein the display panel controller is configured such that at least 80% of the data provided by the panel controller to the at least one adjacent display panel corresponds to the data of the regions of the display portion located in an outer 75% of a surface area of the display portion.

15. The system of claim 14 wherein the extinguishant comprises at least one of a real, simulated or virtual extinguishant, and wherein each display panel controller is configured to receive data corresponding to the modeled fire from the at least one adjacent display panel, and to utilize the received data in determining the changes of the modeled fire.

16. The system of claim 1 wherein the data corresponding to the modeled fire at positions that correspond to the outer edge of the display portion constitutes data corresponding to regions positioned within 5% of a length of a side of the display panel of an outer perimeter thereof, and wherein the display panel controller is configured such that at least 99% of the provided data corresponds to the modeled fire at the outer edge of the display portion over a period of ten seconds.

17. The system of claim 14 wherein the display panels of the array are positioned adjacent to each other and configured to cooperate to together display the simulated fire as a single continuous image distributed across the display panels, and wherein each display panel controller is configured to determine a display status of each of the plurality of regions of the associated display portion based upon data corresponding to the modeled fire.

18. The system of claim 14 wherein each display panel controller is configured to determine qualities of the modeled fire at the plurality of regions based upon parameters relating to at least a type of fire and a nature, size and location of fuel.

19. The system of claim 14 wherein each display portion includes a protective screen which defines the front surface, and wherein the sensor system includes a plurality of sensors, each of which is coupled to or embedded in the protective screen.

20. The system of claim 14 further comprising a simulation array control system operatively coupled to the array of display panels, the simulation array control system comprising:

a computing device that includes a user interface and a processor, the processor configured to coordinate an exchange of edge data of the modeled fire between the array of display panels, wherein the processor is configured to monitor an output of the sensor system such that proper use of the extinguishant, as determined by the processor, causes the processor to reduce a size of the simulated fire.

* * * * *